Sept. 3, 1957  E. A. VERRINDER  2,804,982
BOX DUMPER
Filed June 17, 1950  4 Sheets-Sheet 1

INVENTOR
ERNEST A. VERRINDER
BY
ATTORNEY

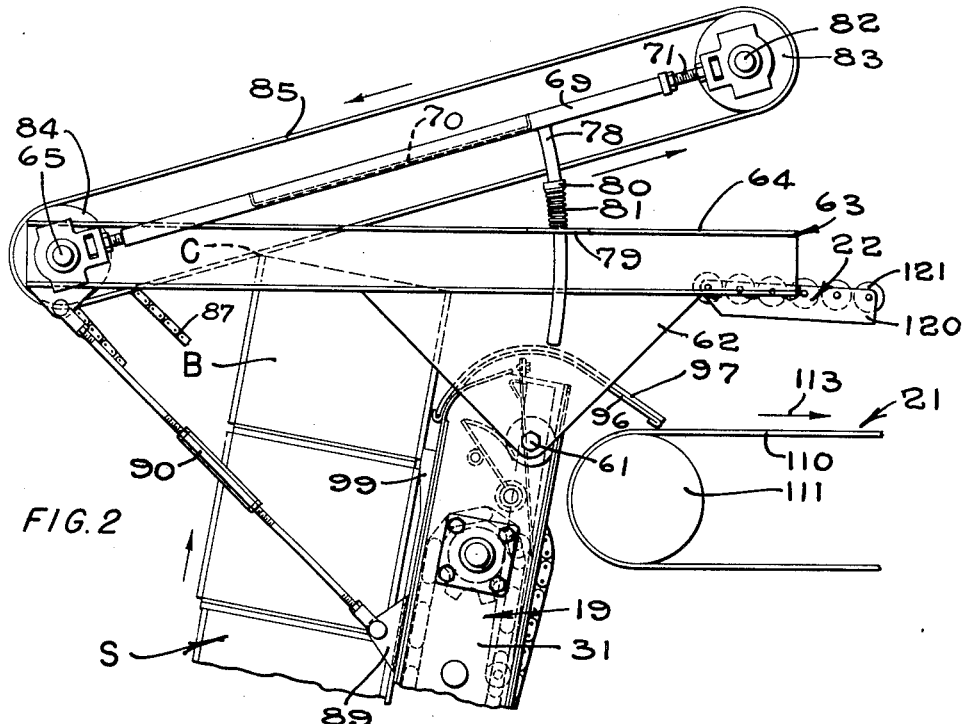
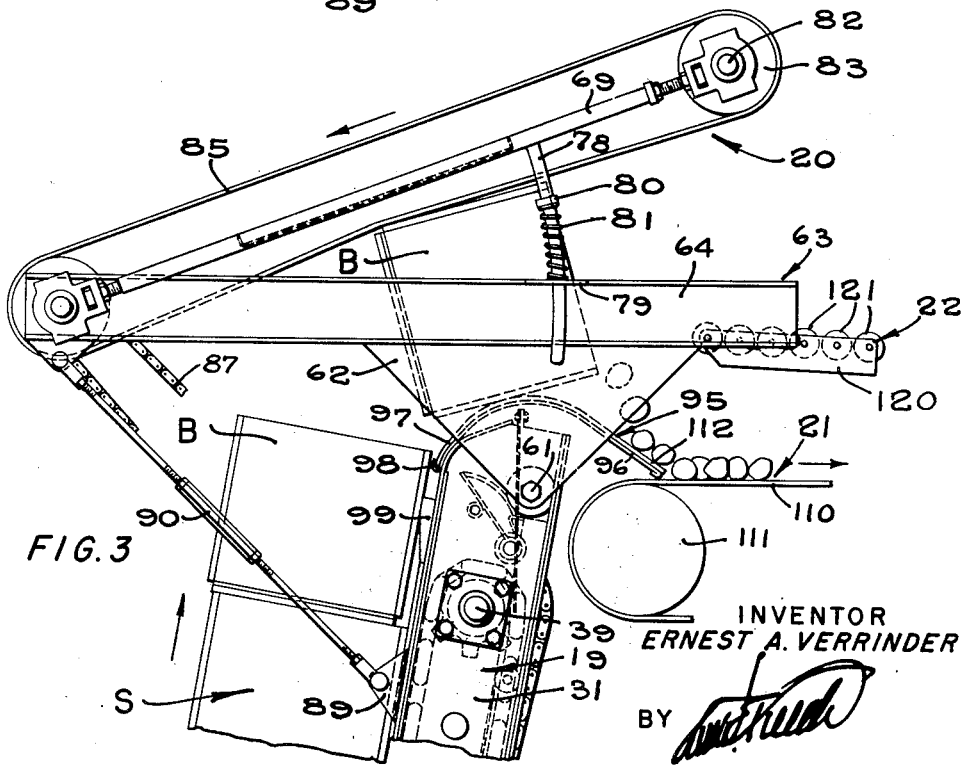

Sept. 3, 1957 E. A. VERRINDER 2,804,982
BOX DUMPER
Filed June 17, 1950 4 Sheets-Sheet 3
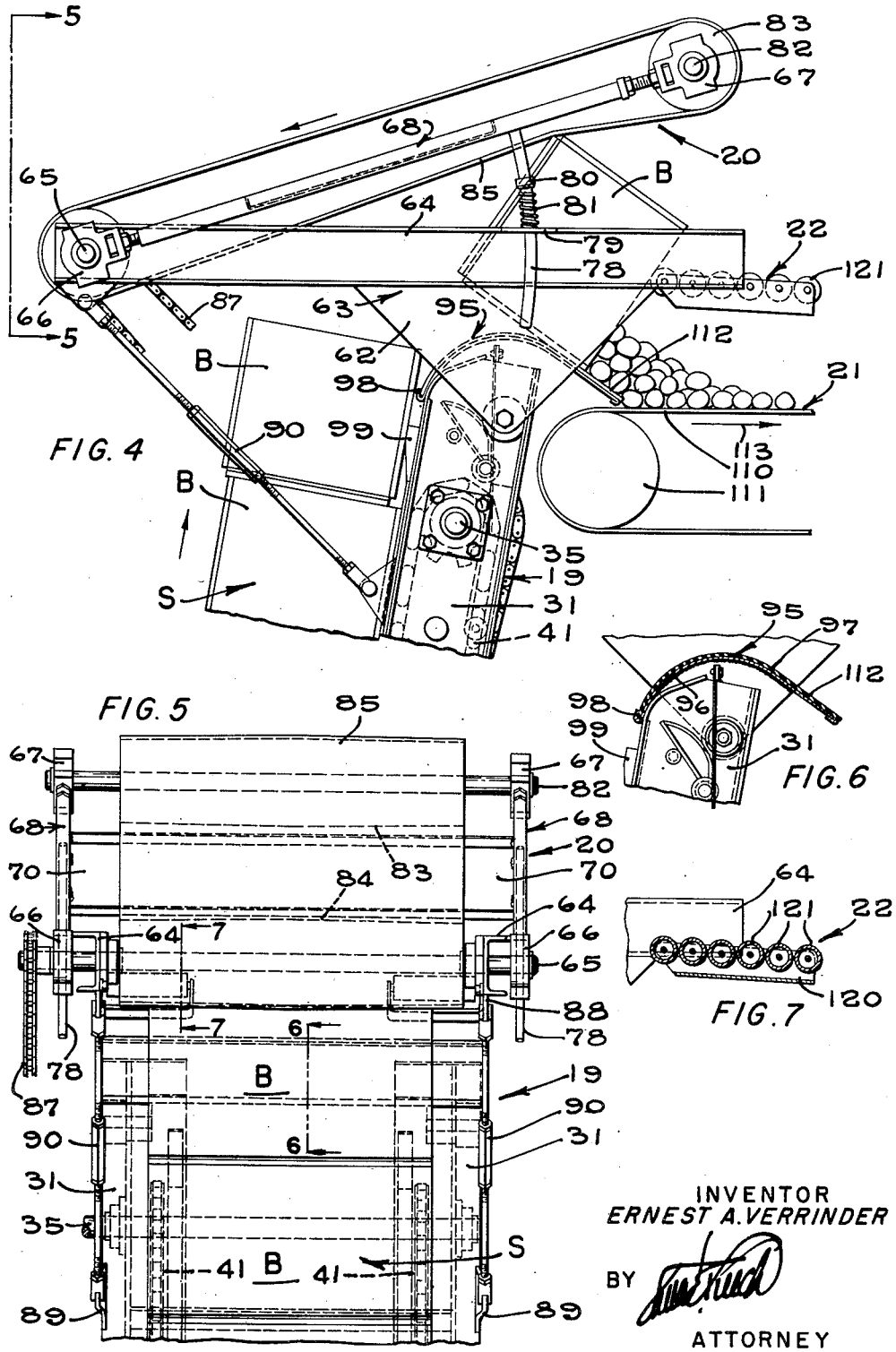
INVENTOR
ERNEST A. VERRINDER
BY
ATTORNEY Sept. 3, 1957      E. A. VERRINDER      2,804,982
BOX DUMPER
Filed June 17, 1950      4 Sheets-Sheet 4
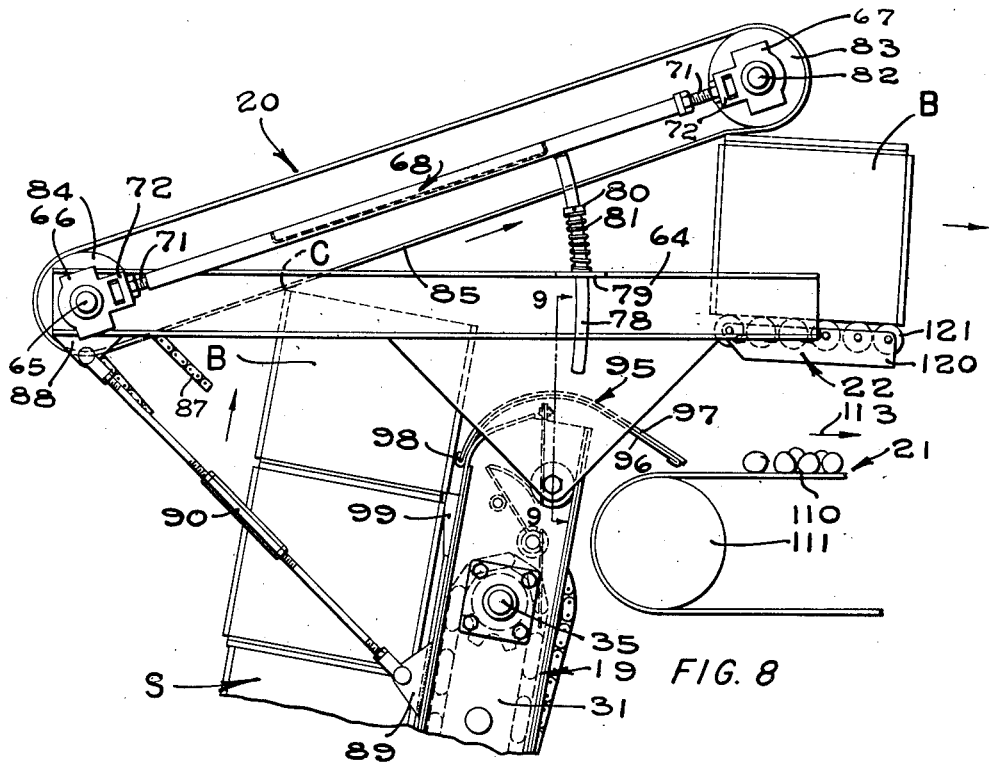
FIG. 8
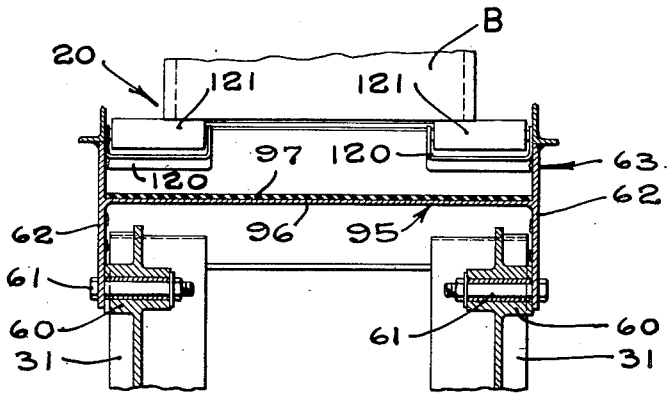
FIG. 9
INVENTOR
ERNEST A. VERRINDER
BY
ATTORNEY

United States Patent Office 2,804,982
Patented Sept. 3, 1957

2,804,982

BOX DUMPER

Ernest A. Verrinder, Riverside, Calif., assignor to Food Machinery and Chemical Corporation, San Jose, Calif., a corporation of Delaware Application June 17, 1950, Serial No. 168,789

7 Claims. (Cl. 214—306)

This invention relates to the art of handling a product in bulk in open top boxes and is particularly useful in dumping the contents from such boxes.

Industries, in which fruit and vegetables are packed fresh for shipment to market, and those devoted to canning fruits and vegetables, are compelled to handle large quantities of loose product in bulk, as when harvesting a crop in the field and bringing it into a packing house or cannery for processing. This is generally accomplished by placing the product in open top boxes from which it must be dumped when arriving at the point where the first step of the processing operation begins.

In these industries there has long been a demand for box dumping devices for dumping from field boxes the product with which they are loaded.

It is accordingly an object of this invention to provide an inexpensive and efficient box dumper.

When packing fruit and certain vegetables for shipping fresh to market, it is very important that bruising be avoided as any bruise increases the susceptibility of the product to softening and decay and lowers the value of the product when this reaches the market.

It is another object of this invention therefore to provide a box dumper that will dump the product from the box in a gentle manner which affords a minimum of opportunity for bruising the product.

Boxes of many different sizes and shapes are employed for the handling of loose fruits and vegetables in various packing and canning operations. Heretofore it has been necessary to design and build a special machine for dumping the contents from the boxes of each particular size and shape. This not only increased the cost of the individual box dumping machine but made it necessary, where more than one style of box was used in a single plant, to have a separate dumping machine for handling each style of box.

It is another object of the present invention to provide a box dumper which is adapted, with little or no adjustment, to dump the contents from boxes differing substantially in size and shape.

In many plants which are already equipped with stack elevators, the necessity may arise for dumping the contents from boxes of the stacks elevated thereon. Heretofore this neecssitated substituting for the stack elevator a stack dumper which itself embodied a stack elevator.

It is yet another object of the present invention to provide a simple box dumping unit which is adapted to be attached to the upper end of practically any stack elevator and which will convert said elevator into a stack dumper.

The manner of accomplishing the foregoing objects as well as further objects and advantages, will be made manifest in the following description taken in connection with the accompanying drawings in which:

Fig. 2 is an enlarged fragmentary view of an upper portion of Fig. 1 and illustrates the position of the uppermost box in a rising stack when the upper near corner of said box comes in contact with the endless belt of the box dumping conveyor.

Fig. 3 is a view similar to Fig. 2 and shows the uppermost box being rotated about a horizontal axis and rolled over a fulcrum at the upper end of the stack elevator so as to start dumping the contents of the box.

Figure 1:
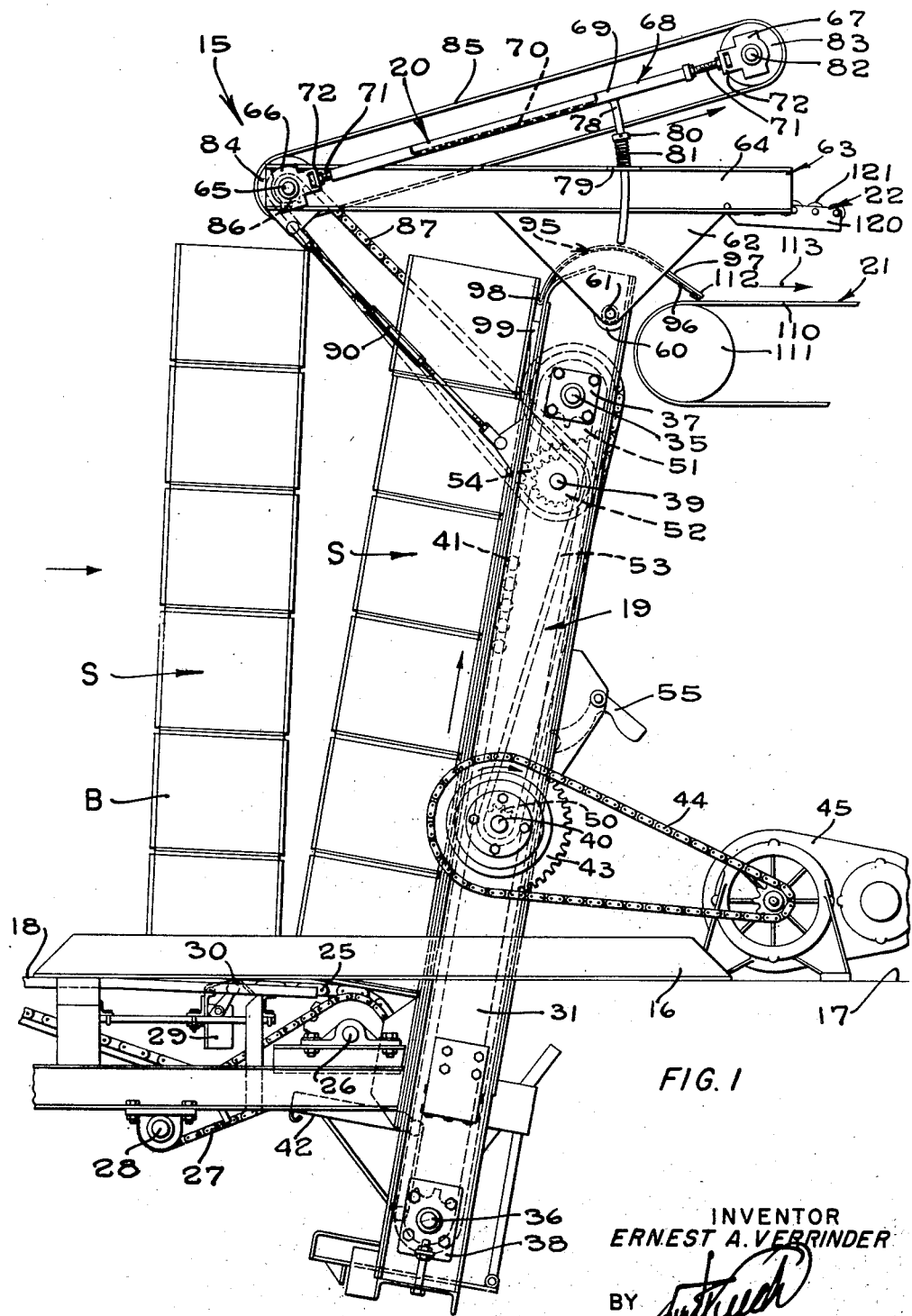
Fig. 1 is a diagrammatic side elevational view of a preferred embodiment of the invention and illustrates two stacks of boxes, the foremost of which has just toppled into an inclined position leaning against the stack elevator while the other stack is being conveyed toward said elevator on a floor track.

Fig. 4 is a view similar to Fig. 3 and illustrates a more advanced step in the rotation of the box where the latter has been rolled over the fulcrum to the point where the box ends have come into contact with an empty box conveyor and the contents of the box have been almost entirely dumped therefrom onto a loose product conveyor, disposed close to and just below the fulcrum, for carrying away the contents of the box as these are dumped from the latter.

Fig. 5 is a fragmentary end elevational view taken on line 5—5 of Fig. 4.

Fig. 6 is a fragmentary transverse vertical sectional view of the fulcrum over which the box is rolled in dumping the contents therefrom and is taken on line 6—6 of Fig. 5.

Fig. 7 is a similar transverse vertical sectional view of the empty box receiving conveyor and is taken on line 7—7 of Fig. 5.

Fig. 8 is a view similar to Fig. 4 and shows how the box dumping conveyor delivers the empty box onto the empty box conveyor after having dumped the contents therefrom. This view also shows how the next uppermost box of the stack arrives in contact with the box dumping conveyor just as the dumping of the previously uppermost box of the stack is being completed.

Fig. 9 is a vertical sectional view taken longitudinally through the box dumping fulcrum and looking toward the box receiving conveyor so as to show how the latter is split in the middle, this view being taken on the line 9—9 of Fig. 8. This view also illustrates the pivotal mounting of the head frame of the elevator structure on the upper ends of side members of said structure.

Referring specifically to the drawings, the invention is there shown as embodied in a stack conveying and elavating and box dumping apparatus 15 which is mounted on a pair of heavy angle iron members 16 supported on a floor 17. The apparatus 15 includes a stack conveyor 18, a stack elevator 19, a box dumping conveyor 20, a loose product conveyor 21 and an empty box conveyor 22.

The stack conveyor 18 includes a pair of endless chains 25 which turn around suitable drive sprockets carried on a drive shaft 26, the latter being driven by a chain 27 which connects this to a shaft 28 which is driven by a separate motor (not shown). Included in the electric circuit of this motor are a number of switches including a switch 29 having an actuating finger 30 which normally extends above the level of the chains 25. These switches are no part of the present invention. In a manner well known in the art, they control the operation of the stack conveyor 18 whereby the latter automatically feeds stacks S of loaded open-top boxes B into elevator 19 as and when the latter is ready to receive the same.

It is to be noted that the end portions of the upper flights of the chains 25 slope downwardly slightly, as shown in Fig. 1, which is for a purpose to be made clear hereinafter.

The elevator 19 includes a pair of side standards 31 which are secured to the angle members 16 and extend upwardly at a relatively slight inclination from vertical. The elevator is located right at the end of the floor or stack conveyor 18 so as to receive stacks S from the latter. The elevator 19 is provided with upper and lower shafts 35 and 36 which are respectively journaled in bearings 37 and 38, the latter being mounted on the standards 31. Also journaling in suitable bearings provided on the standards 31 are upper and lower jack shafts 39 and 40. Trained about suitable sprockets on the shafts 35 and 36 are stacked lifting or elevating chains 41 carrying stack lifting cradles 42, there being a pair of these cradles spaced at equal intervals from each other on the chains 41.

Fixed on one end of the shaft 40 is a large sprocket 43 which is connected by an endless chain 44 to a geared drive motor 45. On the opposite end of shaft 40 is fixed a pinion sprocket 50 and in the same plane therewith a sprocket 51 is mounted on the shaft 35 and a sprocket 52 on the shaft 39. Trained about the sprockets 50, 51 and 52, as shown in Fig. 1, is an endless chain 53. The manner in which this chain is applied to these sprockets causes energizing of the motor 45 to rotate shafts 35 and 39 in opposite directions.

Also fixed on the shaft 39 is a sprocket 54, the purpose of which will be made clear hereinafter.

The stack elevator 19 is equipped with a pair of weighted dogs 55 (Fig. 7) which idle over descending links of the elevator chains 41 but which, immediately upon the halting of the latter, swing inwardly by gravity to engage the next adjacent pair of links in said chains and lock the latter against reverse rotation.

Provided at the upper ends of the standards 31 are bearings 60 in which bolts 61 are mounted, these bolts pivotally fastening vertical plates 62 of a head frame 63 to said bearings. The head frame 63 includes substantially horizontal channel beams 64 to which plates 62 are welded these beams being provided, near their left hand ends, with suitable bearings in which a shaft 65 journals. This shaft also carries bearings 66 which are connected respectively to a pair of bearings 67 by an adjustable spacing frame 68 which includes internally threaded sleeves 69, which are welded to opposite edges of a stiffening plate 70, and bolts 71, the heads of which are trapped in pockets 72 formed in the bearings 66 and 67, said bolts being screwed varying distances into the sleeves 69. Each of the sleeves 69 has an arcuate rod 78 welded thereto, these rods extending downwardly through suitable apertures provided in ears 79 welded on the upper flanges of the channel beams 64 and each rod has a collar 80 which confines a spring 81 coiled about said rod between this collar and the adjacent ear 79.

Journaling in the bearings 67 is a shaft 82 carrying a pulley 83. A similar pulley 84 is fixed on the shaft 65 and the two pulleys have a flexible endless belt 85 trained thereabout the width of which is in excess of the length of a box B. The adjustable spacing frame 68 is expanded so that the belt 85 is kept in a substantially stretched condition.

Fixed on one end of the shaft 65, in the same plane as the sprocket 54 on the shaft 39, is a sprocket 86 which is connected by a chain 87 to the sprocket 54 so that the box dumping conveyor 20 is driven through the shaft 39 by the motor 45.

The ends of channel beams 64 adjacent to the shaft 65 have gussets 88 (Fig. 5) which are connected to corresponding gussets 89 provided on the standards 31 by extensible turnbuckles 90. By manipulation of these turnbuckles the head frame 63 may be rocked relative to the elevator 19 about the axis of the bolts 61. Such an adjustment may be utilized to render the drive chain 87 taut. Sometimes, when a substantial adjustment in the angle of the head frame 63 is desired to be made, the turnbuckles 90 are relaxed enough to permit the chain 87 to be altered in length by introducing thereinto or removing therefrom one or more links, after which the turnbuckles 90 are again tightened up.

Mounted on the side plate 62 of the head frame 63 and coextensive in length with the transverse space between these plates is a box dumping fulcrum member 95. This comprises an arched plate 96, the opposite ends of which are welded to the plate 62, and a rubber pad 97 which covers and is secured by adhesive cement to the upper face of plate 96.

Mounted on the front faces of the standards 31 just beneath the front edge 98 of the arcuate fulcrum plate 96, which is turned up around a leading edge of the rubber pad 97, are wedge cams 99 which are adapted to cam outwardly each box in a stack when the latter rises as shown in Fig. 1 so that the uppermost box misses the lower front edge of the fulcrum member 95. The purpose of this is to free each box from the box immediately therebeneath just before it is to be rotated in the dumping operation.

The loose product conveyor 21 is diagrammatically shown in the drawings in order that adjacent portions of the structure of the invention would not be obscured. This conveyor includes an endless belt 110 which is trained around pulleys 111, the receiving end of this conveyor extending beneath a discharge edge 112 of the fulcrum member 95 and travels in the direction of the arrow 113 so as to rapidly convey away loose products dumped from the boxes B.

Conveyor 21 is also provided, of course, with side walls (not shown) which keep the loose products on the belt 110 while these are being conveyed away by this belt.

The empty box conveyor 22 comprises a pair of roller conveyor sections 120 which are welded to the lower edges of the channel beams 64 and which extend inwardly therefrom and carry rollers 121 upon which boxes B, emptied of their contents, are adapted to travel open-top down.

*Operation*

The apparatus 15 is adapted to receive stacks S of boxes which are placed in a row upon the stack conveyor 18 and are thereby delivered successively to the elevator 19 as shown in Fig. 1. The foremost of these stacks tilts forward slightly as it enters the sloping end section of conveyor 18 and as it goes off of the end of the stack conveyor it topples forward against the elevator standards 31 just at the moment that the bottom of the stack moves into contact with said standards, the situation at this instant being well illustrated in Fig. 1.

Starting the operation of drive motor 45, sets in motion the elevator 19, the box dumping conveyor 20 and the loose product carry-away conveyor 21 as indicated by the arrows adjacent thereto in Fig. 1, the latter conveyor being operatively connected to the motor 45 by an appropriate driving connection, not shown. This causes the cradle 42 next below the foremost stack S to start to lift this stack when it engages the lowermost box therein. When this stack first toppled into engagement with the elevator 19 the end portions of the uppermost box on the side of the elevator engaged the cams 99 and prevented this box moving as far inwardly as the balance of the stack moved as a result of this toppling. This is clearly shown in Fig. 1.

As the stack is now lifted by the elevator, the boxes in the stack successively come into contact with the cams 99 and are individually and successively shifted outwardly into the position in which the uppermost box of the stack is shown in this view. As before noted, this causes each box of the stack to rise outwardly from and alongside the front lower edge 98 of the arcuate fulcrum member 95.

With the continued upward movement of stack S, the uppermost box thereof rises into contact with the lower flight of the belt 85 as shown in Fig. 2. A frictional engagement is thus created between this belt flight and the upper near corner C of the uppermost box B. The belt 85 preferably has a transversely corrugated or crepe finished frictional surface which develops sufficient friction shortly after first contact is made between the uppermost box B and the belt 85, to start this box rotating about an axis which is parallel with the axis of the curved or arcuate fulcrum member 95. This axis constantly changes, of course, although at the start this axis is at the lower right corner of the box. The box rotates a short distance before it engages the fulcrum member 95 and thereafter is in rolling engagement with the fulcrum as shown in Fig. 3 until the box comes in contact with the initial rollers 121 of the empty box conveyor 22 as shown in Fig. 4. The line of engagement between the uppermost box B and the belt 85 has by this time shifted to the normally lower near corner of the box which is now disposed upward and nosed into the yielding surface of the lower flight of the belt 85. The inversion of the box causes the contents thereof to gravitate from the box down the sloping portion 97 of the fulcrum member 95 and on to the conveyor belt 110 which carries the loose product thus deposited thereon away from the fulcrum.

The frictional engagement just described between the uppermost bottom corner of the box and the belt 85, as shown in Fig. 4, results in the box being further swung or tilted substantially about the line of contact between the box and the initial rolls 121 of the empty box conveyor 22 so as to elevate the free end of the box dumping conveyor 20 to permit the box to be rolled between this and the empty conveyor 22, with the result that the box is delivered onto this conveyor open-top down as shown in Fig. 8, and then propelled along this conveyor until it leaves contact with the box dumping conveyor.

As the dumping of the initial uppermost box and the removal of the empty box is thus being completed as shown in Fig. 8, the next highest box B in the stack is seen to have moved up into contact with the belt 85 in the same manner as above described for the initial uppermost box and there is thus no delay in starting the dumping of the contents from the next highest box in the stack. In this manner the rest of the boxes in the stack now successively go through the steps of having the contents dumped therefrom and then being delivered onto the empty box conveyor 22.

The springs 81 yieldably support the weight of the box dumping conveyor 20 on the head frame 63 so that it is unnecessary for the entire weight of this conveyor to be supported upon the box while the box is being rolled between the fulcrum member 95 and belt 85, or between the empty box conveyor 20 and said belt.

It is also to be noted that the belt 85 is flexible, that it is yieldably supported with the belt extending through the path along which the boxes are lifted, and that the function of the belt is accomplished, broadly speaking, by moving it lengthwise towards said box lifting path during the period each box is in contact therewith so as to roll the box between the belt and the fulcrum 95 and empty box conveyor 20 by virtue of the belt being mounted and moved in this manner.

Another feature to be noted is the mounting of the box dumping conveyor 20 and the fulcrum 95 and the empty box conveyor 22 on the same structure 63 which is in turn pivotly mounted on the uppermost end of the elevator 19. This maintains a uniform relation between these three elements throughout the adjustments about the axis of the bolts 61 which might be necessary to tighten the chain 87 or to provide the proper location of the belt 85 at the moment of initial contact between the box and the belt. Obviously, swinging the head frame 63 in an anti-clockwise direction about the bolts 61, advances the movement when the upper left hand or near corner of the uppermost box initially contacts the belt 85. It should also be noted that the arcuate fulcrum 95 is formed, for the most part, substantially concentric with the axis of the bolts 61. Thus no change is effected in the dumping operation by such an adjustment about said axis.

In the apparatus 15, it is thus seen that the elements directly involved in the dumping operation are embodied with the head frame 63 as a unit which is attached by the bolts 61 and the turnbuckles 90 to the stack elevator 19. Stack elevators of this type for which this invention is designed, are in themselves quite old in the art, and it is one of the distinct advantages of the present invention that it provides a box dumping unit which may be mounted on the upper end of any standard box stack elevator and readily convert this into a stack dumper having the peculiar merits of the present invention.

This invention couples extreme simplicity and a very smooth and gentle dumping operation, adapted to be used in handling fresh fruits and vegetables, with a capacity which is limited only by the susceptibility of the product being damaged by fast handling.

The entire function of removing a loaded box from the upper end of a rising stack, the rotating of this box and dumping the contents therefrom, and the delivery of this box onto an empty conveyor is accomplished by the constantly rotating endless belt 85 alone.

The drawings illustrate the dumping of a box of only one size and shape, but this invention is adapted to handle boxes differing widely in shape and size with little or no adjustment. For instance, a half box of substantially the same length and width as box B, but approximately half as deep can readily be handled in the dumper 15, without any change in adjustment, and the half box will be dumped in approximately the same manner as described for the dumping of box B.

Where a narrower box than box B is to be handled it may be necessary to shift the collars 80 upwardly on the rods 78 to give the dumper conveyor 20 a slightly less inclination upwardly from the horizontal when in its normal position as shown in Fig. 1. The lower flight of belt 85 would then be spaced at a less distance from the fulcrum member 95 and thus be adapted to dump boxes narrower than box B.

From the foregoing it is evident that the dumper 15 is adapted to handle boxes varying substantially in size and shape with very little, if any, adjustment of the dumper being required.

While a disclosure of the invention and explanation of the advantages thereof is accomplished herein by reference to only a single embodiment thereof, it is to be understood that various changes may be made in this and that the invention may have many different forms, without departing from the spirit of the invention or the scope of the appended claims.

The claims are:

1. In a stack dumper the combination of: an elevator adapted to receive and elevate a stack of loaded open-top boxes along a rising path with the open tops of said boxes disposed upward; an endless flexible belt; a pair of pulleys; means mounting said pulleys in spaced relation above said elevator on opposite sides of said path, said belt being trained about said pulleys to suspend said belt in flexible stretched condition with the lower flight thereof extending through said path so that said lower belt flight is immediately engaged by the closest portion of the uppermost box of a rising stack upon said box portion reaching the plane of said lower belt flight; means for driving said belt so that the lower flight thereof travels through said path so that frictional contact between said lower flight and the portion of said box engaging the same rolls said box from the upper end of said stack; a fulcrum member disposed alongside said uppermost box as the latter comes into engagement with said lower belt flight, said fulcrum member being disposed in the path of travel of said box as it is rolled by said lower belt flight, and spaced such a distance from said lower belt flight that said box is rolled upwardly over said fulcrum member and between the latter and said lower belt flight with said lower belt flight remaining in frictional contact with said box, thereby inverting said box and dumping the contents therefrom, said pulley mounting means cooperating with said endless flexible belt and said pair of pulleys to define a box dumping conveyor, means for yieldably mounting said conveyor whereby it yields in an upward direction to pressure imposed thereon from beneath by the passage of said box between said fulcrum member and said belt during the rolling of said box to dump the contents therefrom, means providing side standards for said elevator, a head frame pivotally mounted on said side standards; means for pivotally mounting said dumping conveyor on said head frame to permit said conveyor to swing upwardly in response to upward pressure thereagainst by said box; and means for adjustably fixing said head frame in a given rotational relationship on its said pivotal mounting relative to said side standards, the pivotal mounting of said conveyor on said head frame being disposed a substantial distance from said elevator on the opposite side of said stack elevating path from said fulcrum member.

2. In a stack dumper the combination of: an elevator adapted to receive and elevate a stack of loaded open-top boxes along a rising path with the open tops of said boxes disposed upward; an endless flexible belt; a pair of pulleys; means mounting said pulleys in spaced relation above said elevator on opposite sides of said path, said belt being trained about said pulleys to suspend said belt in flexible stretched condition with the lower flight thereof extending through said path so that said lower belt flight is immediately engaged by the closest portion of the uppermost box of a rising stack upon said box portion reaching the plane of said lower belt flight; means for driving said belt so that the lower flight thereof travels through said path so that frictional contact between said lower flight and the portion of said box engaging the same rolls said box from the upper end of said stack; a fulcrum member disposed alongside said uppermost box as the latter comes into engagement with said lower belt flight, said fulcrum member being disposed in the path of travel of said box as it is rolled by said lower belt flight, and spaced such a distance from said lower belt flight that said box is rolled upwardly over said fulcrum member and between the latter and said lower belt flight with said lower belt flight remaining in frictional contact with said box, thereby inverting said box and dumping the contents therefrom, said pulley mounting means cooperating with said endless flexible belt and said pair of pulleys to define a box dumping conveyor, means for yieldably mounting said conveyor whereby it yields in an upward direction to pressure imposed thereon from beneath by the passage of said box between said fulcrum member and said belt during the rolling of said box to dump the contents therefrom, means providing side standards for said elevator, a head frame pivotally mounted on said side standards; means for pivotally mounting said dumping conveyor on said head frame to permit said conveyor to swing upwardly in response to upward pressure thereagainst by said box; means for adjustably fixing said head frame in a given rotational relationship on its said pivotal mounting relative to said side standards, the pivotal mounting of said conveyor on said head frame being disposed a substantial distance from said elevator on the opposite side of said stack elevating path from said fulcrum member, means mounting said fulcrum on said head frame, and an empty box conveyor spaced upwardly from said fulcrum member and downwardly from the discharge end of said box dumping conveyor, said empty box conveyor being mounted on said head frame in a position to lie in the way of and be engaged by the open top of a box as the latter is rolled into dumping position by said lower box dumping conveyor belt flight, said last mentioned lower belt flight being of sufficient length to continue in engagement with said box, after the latter has reached said dumping position, thereby propelling said box upwardly onto said empty box conveyor.

3. In a device for dumping the contents from loaded open-top boxes, the combination of: a frame structure including a pair of substantially vertically disposed frame elements spaced horizontally from each other; a horizontally disposed fulcrum member extending between and secured at its ends to said frame elements; an empty box conveyor having a portion thereof secured on said frame elements and extending therefrom in a plane disposed above and away from said fulcrum member; an endless-belt box-dumping conveyor having a drive shaft on which said box dumping conveyor is pivotally mounted, said drive shaft being supported by said frame elements on an axis disposed a substantial distance on the opposite side of said fulcrum member than said empty box conveyor, said dumping conveyor extending toward and obliquely upwardly over said fulcrum member and over said empty box conveyor, said dumping conveyor having means for driving the same to cause the lower flight thereof to travel continuously over said fulcrum member and thence over said empty box conveyor, said fulcrum member and said lower conveyor flight being so spaced that when a box to be dumped is delivered upwardly between said fulcrum member and said dumping conveyor axis, the portion of said box disposed nearest said lower flight engages the latter immediately upon said box portion arriving in the plane of said lower conveyor flight, said box engagement with said lower conveyor flight frictionally propelling said box against said fulcrum member while rolling said box over the latter and dumping the contents of said box, the open top of said box with the latter in said dumping position engaging the adjacent end of said empty box conveyor, whereby continued engagement of said lower conveyor flight with said box propels said box upwardly in inverted position onto said empty box conveyor.

4. In a device for dumping the contents from loaded open-top boxes, the combination of: a frame structure including a pair of substantially vertically disposed frame elements spaced horizontally from each other; a horizontally disposed fulcrum member extending between and secured at its ends to said frame elements; an empty box conveyor having a portion thereof secured on said frame elements and extending therefrom in a plane disposed above and away from said fulcrum member; an endless-belt box-dumping conveyor having a drive shaft on which said box dumping conveyor is pivotally mounted, said drive shaft being supported by said frame elements on an axis disposed a substantial distance on the opposite side of said fulcrum member from said empty box conveyor, said dumping conveyor extending toward and obliquely upwardly over said fulcrum member and over said empty box conveyor, said dumping conveyor having means for driving the same to cause the lower flight thereof to travel continuously over said fulcrum member and thence over said empty box conveyor, said fulcrum member and said lower conveyor flight being so spaced that when a box to be dumped is delivered upwardly between said fulcrum member and said dumping conveyor axis, the portion of said box disposed nearest said lower flight engages the latter immediately upon said box portion arriving in the plane of said lower conveyor flight, said box engagement with said lower flight frictionally propelling said box against said fulcrum member while rolling said box over the latter and dumping the contents of said box, the open top of said box with the latter in said dumping position engaging the adjacent end of said empty box conveyor, whereby continued engagement of said lower conveyor flight with said box propels said box upwardly in inverted position onto said empty box conveyor, means providing a convex upper face on said fulcrum member substantially cylindrical in character relative to a fulcrum axis, means for pivotally securing said frame structure to a stack elevator disposed beneath said fulcrum axis for delivering boxes to said dumping conveyor; and means for adjustably positioning said dumping conveyor on said stack elevator along an arc centered upon said fulcrum axis.

5. In a stack dumper, the combination of: means for elevating a stack of open loaded boxes with their open tops disposed upwardly; an endless-belt box-dumping conveyor mounted in the path along which said stack is being elevated so that the lower flight of said belt conveyor will be tangent with an adjacent upper portion of the uppermost box of said stack and thus be frictionally engaged by said box portion at the instant said upper box portion rises to a given level regardless of variation, within a substantial range, in the height of said stack; a fulcrum member mounted to be disposed alongside said uppermost box when said upper box portion has risen to said level; means for continuously driving said elevating means and said belt conveyor to cause said stack to rise and the lower flight of said belt conveyor to travel toward said fulcrum member from the area of said tangency whereby said box and the balance of the boxes in said stack will be successively and individually rolled by said belt conveyor over said fulcrum member and the contents dumped therefrom, said belt conveyor remaining in controlling engagement with each box from the point of first contact therewith and through a point in the rolling of said box where the contents are completely dumped from said box, said lower belt flight being upwardly inclined in the direction of its travel; and an empty box conveyor mounted above the level of said fulcrum member in a position to arrest the rocking of each box with the latter inverted in product dumping position, said lower belt flight extending over said empty box conveyor and continuing in frictional contact with each box to lift the latter from said dumping position onto and propel said box along said empty box conveyor.

6. A combination as in claim 5 in which said belt conveyor is pivotally mounted at the end thereof away from which said lower flight travels, and is free to swing about the axis of said mounting to accommodate itself to said boxes.

7. A combination as in claim 6 having means for adjusting the spacing between said belt conveyor and said fulcrum member when no box is in engagement with said belt conveyor.

References Cited in the file of this patent

UNITED STATES PATENTS

| | | |
|---|---|---|
| 555,481 | Grimmett | Feb. 25, 1896 |
| 1,210,096 | Parker | Dec. 26, 1916 |
| 1,907,456 | Stevenson | May 9, 1933 |
| 2,254,550 | Stevenson | Sept. 2, 1941 |
| 2,517,956 | Albertoli | Aug. 8, 1950 |